United States Patent
Kao

(10) Patent No.: US 7,765,390 B2
(45) Date of Patent: Jul. 27, 2010

(54) ACTIVATION SYSTEM

(75) Inventor: Chih-Yuan Kao, Taipei (TW)

(73) Assignee: Twinhead International Corp., Taipei (TW)

( * ) Notice: Subject to any disclaimer, the term of this patent is extended or adjusted under 35 U.S.C. 154(b) by 721 days.

(21) Appl. No.: 11/621,950

(22) Filed: Jan. 10, 2007

(65) Prior Publication Data

US 2007/0162737 A1 Jul. 12, 2007

(30) Foreign Application Priority Data

Jan. 11, 2006 (TW) .............................. 95200661 U

(51) Int. Cl.
G06F 1/00 (2006.01)
G06F 1/26 (2006.01)
G06F 9/00 (2006.01)
G06F 15/177 (2006.01)

(52) U.S. Cl. ................... 713/1; 713/2; 713/300
(58) Field of Classification Search ............... 713/1, 713/2, 300
See application file for complete search history.

(56) References Cited

U.S. PATENT DOCUMENTS

| 4,663,707 | A  | * | 5/1987 | Dawson ................... 713/2 |
| 4,951,171 | A  | * | 8/1990 | Tran et al. ................ 361/90 |
| 5,511,204 | A  | * | 4/1996 | Crump et al. ............. 713/330 |
| 6,288,522 | B1 | * | 9/2001 | Odaohhara et al. ........ 320/138 |
| 6,775,784 | B1 | * | 8/2004 | Park ....................... 713/320 |
| 7,552,217 | B2 | * | 6/2009 | Mihm et al. ............. 709/227 |
| 2004/0183374 | A1 | * | 9/2004 | Ponmalai ................ 307/9.1 |

OTHER PUBLICATIONS

White Ron, How Computers Work, 2002, Que, 6th ed.,pp. 16-17.*

* cited by examiner

*Primary Examiner*—Mark Connolly
(74) *Attorney, Agent, or Firm*—Wang Law Firm; Li K. Wang

(57) ABSTRACT

An activation system is applied to a computer apparatus. An activation signal is received by the computer apparatus to implement a booting action. The system comprises an external power adapter and a detection unit. An external power is received by the external power adapter. The external power then is provided to the computer apparatus. Meanwhile, a power supply signal then is generated by the external power adapter. The power supply signal is detected by the detection unit. The activation signal is outputted by the detection unit after detecting the power supply signal, so as to boot the computer apparatus through the external power.

16 Claims, 4 Drawing Sheets

ACTIVATION SYSTEM

FIELD OF THE INVENTION

The present invention relates to an activation system, and more particularly to the activation system that controls a computer to implement booting by detecting a power supply signal of an external power.

BACKGROUND OF THE INVENTION

Referring to FIG. 1, a block diagram illustrates a conventional computer apparatus. The computer apparatus is booted or shut down through a button to control the main power supply. As shown in FIG. 1, the computer apparatus includes a power supplier 11, a main system 12, an interface controller 13, a keyboard 14, a mouse 15 and other input/output interface 16. The power supplier 11 includes a button 111. The power supplier 11 could obtain a booting signal through a user pressing the button 111. A main power 112 then is provided to the main system 12, the interface controller 13, the keyboard 14, the mouse 15 and other input/output interface 16, thereby achieving the goal of booting the computer apparatus. In addition, the user presses the button 111 after the computer is booted to enable the power supplier 11 to obtain a shut down signal. The power supplier 11 then is stopped supplying the main power 112 to the main system 12, the interface controller 13, the keyboard 14, the mouse 15 and other input/output interface 16, thereby achieving the goal of shutting down the computer apparatus.

Referring to FIG. 2, a block diagram illustrates a conventional apparatus for controlling a power supplier 21. The apparatus includes a power controller 22, a keyboard 23, a mouse 24 and a recognition controller 25. The power supplier 21 generates a power with 5 voltages. The power with 5 voltages is supplied to the power controller 22, the keyboard 23, the mouse 24 and the recognition controller 25. The recognition controller 25 is used to detect input signals provided by the keyboard 23 and the mouse 24 to determine whether or not the input signals are signals for booting. For instance, the input signals are inputted by pressing some keys of the keyboard 23 simultaneously or by clicking the mouse 24 several times. Therefore, the recognition controller 25 could control the power controller 22 to output a booting signal to the power supplier 21. The power supplier 21 then is triggered to supply a main power to a main system 26 of the computer and an interface controller 27 so as to achieve the goal of booting.

However, the aforesaid conventional techniques must input a booting signal through the user to control the computer apparatus to be booted to cause inconvenience.

The inventor of the present invention based on years of experience from related research and development invents an activation system for a computer to overcome the foregoing shortcomings.

SUMMARY OF THE INVENTION

Accordingly, the object of the present invention is to provide an activation system. More specifically, the computer is controlled to implement the booting by detecting a power supply signal of an external power so as to simplify the booting steps for the computer and increase convenience.

To achieve the aforesaid object, the activation system disclosed by the present invention is applied to the computer for receiving an activation signal to implement booting. The system includes an external power adapter and a detection unit. The computer implements a booting procedure to activate an operating system (OS). The external power adapter could receive the external power and provide the external power to the computer. Meanwhile, the external power adapter then generates the power supply signal. The external power is an operational power for the computer implementing the booting procedure and activating the operating system. The detection unit is used to detect the power supply signal. When the power supply signal is detected, the detection unit then outputs the activation signal to the computer to control the computer to implement the booting. Moreover, when the computer implements the booting, the computer outputs a shutdown signal to the detection unit simultaneously. The detection unit then is controlled to stop detecting.

The external power adapter is electrically connected to an alternating current (AC) power plug to receive AC power. AC power then is converted into the external power with stable voltage. A battery is also disposed in the computer. The power of the battery can be the operational power required for booting the computer. Furthermore, the external power adapter could implement a charging action for the battery through the computer. Additionally, the system further includes a setting switch that is used to set or stop running the detection unit.

Other features and advantages of the present invention and variations thereof will become apparent from the following description, drawings, and claims.

DETAILED DESCRIPTION OF THE PREFERRED EMBODIMENTS

Figure 1:
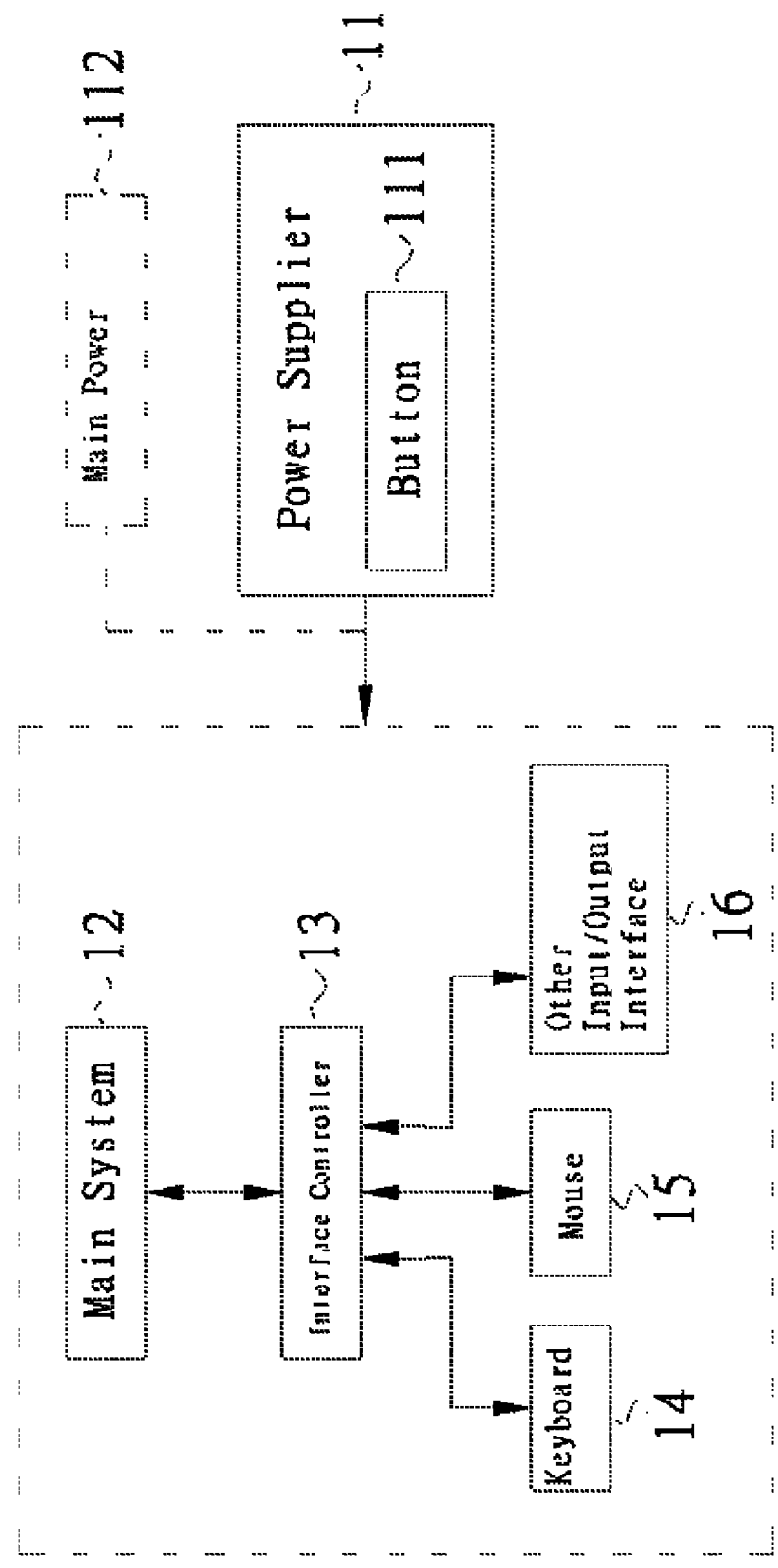
FIG. 1 is a block diagram illustrating a conventional computer apparatus.
Figure 2:
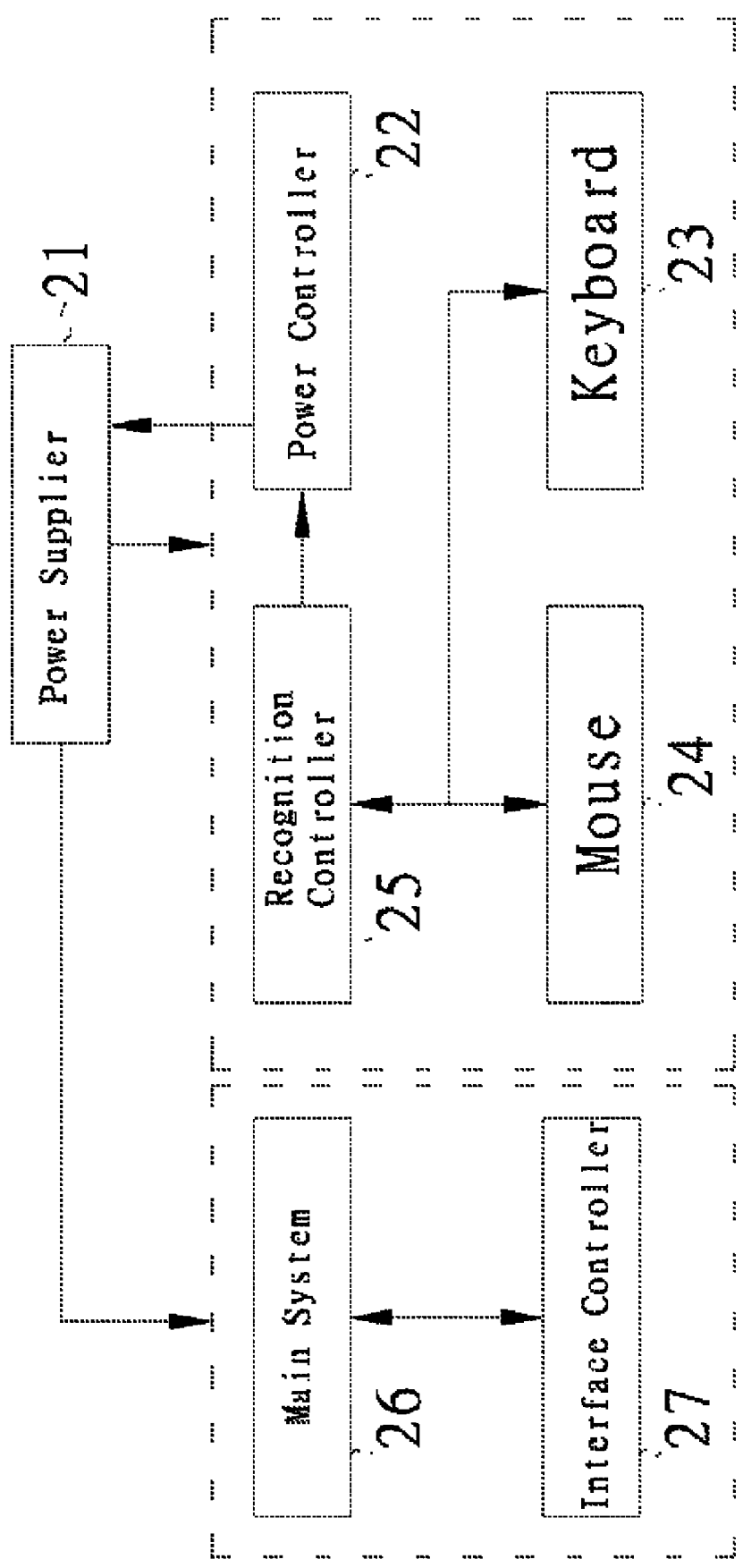
FIG. 2 is a block diagram illustrating a conventional apparatus controlling a power supplier.
Figure 3:
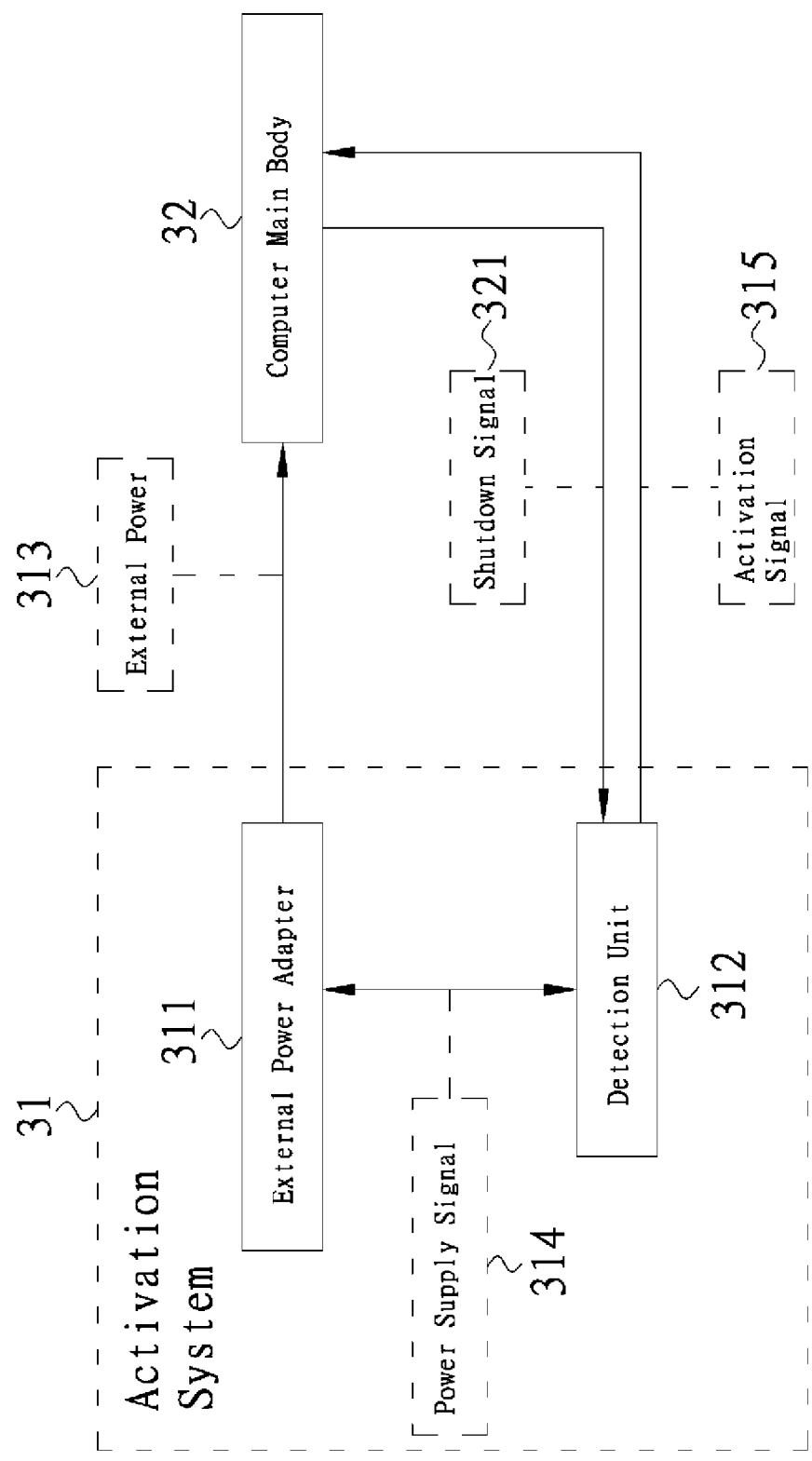
FIG. 3 is a block diagram illustrating an activation system according to an embodiment of the present invention.

Referring to FIG. 3, a block diagram illustrates an activation system according to an embodiment of the present invention. The activation system 31 includes an external power adapter 311 and a detection unit 312. The external power adapter 311 and the detection unit 312 are electrically connected to a computer main body 32. The external power adapter 311 is used to receive alternating current (AC) power. AC power is then converted into an external power 313 with stable voltages. Secondly, the external power adapter 311 transmits the external power 313 to the computer main body 32. A power supply signal 314 then is generated simultaneously The detection unit 312 is used to detect the power supply signal 314. When the detection unit 312 detects the power supply signal 314, an activation signal 315 is outputted to the computer main body 32 to control the computer main body 32 to implement the booting. Moreover, while implementing the booting procedure, the computer main body 32 outputs a shutdown signal 321 to the detection unit 312 to control the detection unit 312 to stop running. The computer main body 32 is preferably a portable computer main body. The external power adapter 311 is preferably a power adapter. The detection unit 312 is preferably a control circuit.

Figure 4:
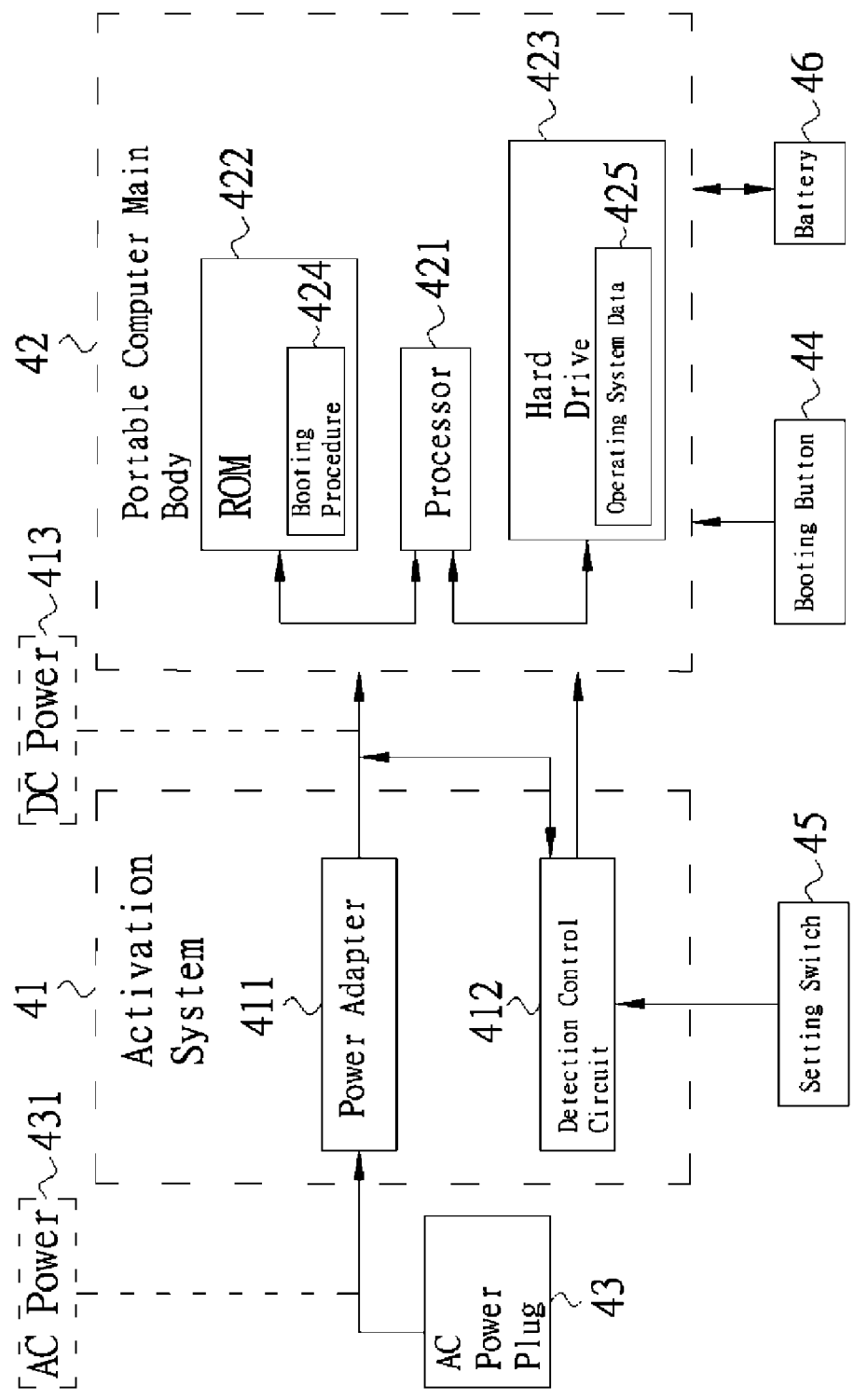
FIG. 4 is a block drawing illustrating an activation system according to a preferred embodiment of the present invention.

Referring to FIG. 4, a block diagram illustrates an activation system according to a preferred embodiment of the present invention. The system is applied to a portable computer. As shown in FIG. 4, the activation system 41 includes a power adapter 411 and a detection control circuit 412. The power adapter 411 and the detection control circuit 412 are electrically connected to a portable computer main body 42. The portable computer main body 42 includes a processor 421, a read-only memory (ROM) 422 and a hard drive 423. The power adapter 411 is electrically connected to an alternating current (AC) power plug 43 and the portable computer main body 42. The power adapter 411 could receive AC power 431 from 100 to 240 voltages through the AC power plug 43. AC power 431 then is converted into direct current (DC) 413 with stable voltage of 19 voltages. Secondly, DC 413 is provided to the portable computer main body 42. The detection control circuit 412 is used to detect voltages of a position for electrically connecting the power adapter 411 and the portable computer main body 42, and then determines whether or not the portable computer main body 42 is controlled to implement booting based on a detection result. When the voltage of the position for electrically connecting the power adapter 411 and the portable computer main body 42 detected by the detection control circuit 412 is 19 voltages, the portable computer main body 42 is controlled to implement the booting. The portable computer main body 42 implementing the booting is that the processor 421 reads a booting procedure 424 from the ROM 422 and then executes it. The processor 421 then reads operating system data 425 from a hard drive 423 to execute the operating system. DC power 413 is an operational power required for the portable computer main body 42 implementing the booting procedure 424 and activating the operating system. Moreover, when the portable computer main body 42 implements the booting, the works of the detection control circuit 412 then is discontinued.

In addition, the portable computer main body 42 is electrically connected to a battery 46. The battery 46 also supplies the operational power to the portable computer main body 42. The power adapter 411 could implement a charging action for the battery 46 through the portable computer main body 42. The portable computer main body 42 is electrically connected to a booting button 44 to enable an operation end to control the portable computer main body 42 to implement the booting so as to become alternate booting way for the portable computer main body 42. When the portable computer main body 42 implements the booting, a portion of current is outputted to the detection control circuit 412 to discontinue the work of the detection control circuit 412. The detection control circuit 412 is electrically connected to the setting switch 45 to enable the operation end to set the detection control circuit 412 to be discontinued or conducted, thereby activating or inactivating the work of the detection control circuit 412.

Although the features and advantages of the embodiments according to the preferred invention are disclosed, it is not limited to the embodiments described above, but encompasses any and all modifications and changes within the spirit and scope of the following claims.

What is claimed is:

1. An activation system applied to a computer for generating an activation signal to initiate booting of said computer, comprising:
    an external power adapter for receiving an external power and providing said external power to said computer so as to generate a power supply signal; and
    a detection unit for detecting said power supply signal and generating said activation signal;
    wherein when said detection unit detects said power supply signal, said detection unit outputs said activation signal to said computer, and
    wherein the computer includes a setting switch for activating the detection unit.

2. The activation system of claim 1, wherein said computer is a portable computer.

3. The activation system of claim 1, wherein said external power adapter is electrically connected to an alternating current (AC) power plug.

4. The activation system of claim 1, wherein said computer further comprising a booting button for providing said activation signal independently from the detection unit to said computer.

5. The activation system of claim 1, wherein said computer has a battery, and power of said battery is an operational power required for booting said computer.

6. The activation system of claim 5, wherein said external power adapter implements a charging action for said battery through said computer.

7. The activation system of claim 1, wherein said computer has a processor, a read-only memory (ROM) and a hard drive.

8. The activation system of claim 7, wherein said computer implementing booting by said processor reading and executing a booting sequence of said ROM.

9. The activation system of claim 8, wherein after said processor executes said booting sequence, an operating system (OS) of said hard drive is then activated to accomplish booting.

10. An activation system applied in a computer for generating an activation signal to initiate booting of said computer, comprising;
    an external power adapter for receiving an external power and providing said external power to said computer so as to generate a power supply signal; and
    a detection unit for detecting said power supply signal and generating said activation signal;
    wherein when said detection unit detects said power supply signal, said detection unit outputs said activation signal to said computer, and
    wherein when said computer implements booting, the computer provides a shutdown signal to said detection unit, and said detection unit stops detecting.

11. The activation system of claim 10, wherein said computer further comprising a booting button for providing said activation signal independently from the detection unit to said computer.

12. The activation system of claim 10, wherein said computer has a battery, and power of said battery is an operational power required for booting said computer.

13. The activation system of claim 12, wherein said external power adapter implements a charging action for said battery through said computer.

14. The activation system of claim 10, wherein said computer has a processor, a read-only memory (ROM) and a hard drive.

15. The activation system of claim 14, wherein said computer implementing booting by said processor reading and executing a booting sequence of said ROM.

16. The activation system of claim 15, wherein after said processor executes said booting sequence, an operating system (OS) of said hard drive is then activated to accomplish booting.

* * * * *